United States Patent [19]

Kawamura

[11] Patent Number: 4,774,811
[45] Date of Patent: Oct. 4, 1988

[54] APPARATUS FOR RECOVERING THERMAL ENERGY FROM ENGINE

[75] Inventor: Hideo Kawamura, Samukawa, Japan

[73] Assignee: Isuzu Motors Limited, Tokyo, Japan

[21] Appl. No.: 13,044

[22] Filed: Feb. 10, 1987

[30] Foreign Application Priority Data

Feb. 10, 1986 [JP] Japan ................... 61-27379

[51] Int. Cl.$^4$ .............. F02B 37/10; B60K 1/04
[52] U.S. Cl. ................... 60/608; 180/65.3; 180/165; 290/52
[58] Field of Search .............. 60/597, 607, 608; 180/65.2, 65.3, 65.4, 65.5, 65.6, 165; 290/52

[56] References Cited

U.S. PATENT DOCUMENTS 1,984,830 12/1934 Higley ..................... 180/65.2 X
2,949,541 8/1960 Addie et al. ............... 180/65.4 X
4,097,752 6/1978 Wulf et al. ................ 180/65.2 X

FOREIGN PATENT DOCUMENTS 141712 8/1984 Japan ..................... 60/608

Primary Examiner—Michael Koczo
Attorney, Agent, or Firm—Staas & Halsey

[57] ABSTRACT

An apparatus for recovering thermal energy from an engine of a motor vehicle has a first rotary electric machine coupled to a turbocharger mounted on the engine, a second rotary electric machine coupled to an exhaust turbine disposed in an exhaust system of the engine, and a third rotary electric machine mounted on an axle of the motor vehicle. The apparatus also includes respective means for detecting an engine rotational speed, an engine load, and an engine boost pressure. The first, second, and third rotary electric machines are controlled on the basis of signals from these means for effective utilization of the energy of an exhaust gas discharged from the engine.

13 Claims, 7 Drawing Sheets

APPARATUS FOR RECOVERING THERMAL ENERGY FROM ENGINE

BACKGROUND OF THE INVENTION

1. Field of the Invention

The present invention relates to an apparatus for recovering thermal energy from an engine which is operated by burning fuel, and more particularly to such a thermal energy recovery apparatus for recovering exhaust energy of an engine.

2. Description of the Related Art

There have been developed in recent years thermally insulated engines having various components made of thermally insulating materials, such as ceramics. These components include, for example, outer wall of an exhaust manifold, cylinder liners, insulating plates for a cylinder head, and pistons. In such a thermally insulated engine, it is not necessary to cool the engine by radiating the heat generated inside the engine. Rather, the energy of high-temperature exhaust gas discharged by the engine is recovered and fed back to the output shaft of the engine for increasing the output power from the engine.

A so-called turbo compound engine has been proposed as an exhaust energy recovery apparatus. According to the turbo compound engine, a turbocharger is operated by the exhaust energy from an engine to supercharge the engine, and an exhaust turbine is driven by exhaust gas having residual energy which is discharged from the turbocharger. Rotary power from the exhaust turbine is fed back to the output shaft of the engine.

However, the turbo compound engine of the type described above requires a speed reducer having a large speed reduction ratio in order to allow the rotational speed of the exhaust turbine, which is rotated at high speed by the exhaust energy, to match the rotational speed of the engine. Therefore, such an exhaust energy recovering apparatus is large in size, and the power transmission efficiency is less than the efficiency desired.

To solve the problems of the above turbo compound engine, the inventor has proposed an exhaust energy recovery apparatus as disclosed in Japanese patent application No. 60-233938. The exhaust energy recovery apparatus proposed therein includes a generator driven by a turbine disposed in an exhaust pipe, another generator driven by another turbine disposed at the exhaust outlet of the first turbine, and a motor coupled to the drive shaft of a motor vehicle. The two generators are controlled according to the operating condition of the motor vehicle, for driving the motor to give assistive running power to the motor vehicle.

However, the above proposed energy recovery apparatus still has drawbacks. It fails to recover exhaust energy in a wide range of engine operating conditions, since where exhaust energy is recovered according to the depth to which an accelerator pedal is depressed, it is recovered dependent on the ratio between an engine intake pressure and a boost pressure.

SUMMARY OF THE INVENTION

Accordingly, it is an object of the present invention to provide an apparatus for recovering thermal energy from an engine. The apparatus includes a first rotary electric machine coupled to a turbocharger mounted on the engine, a second rotary electric machine coupled to an exhaust turbine disposed in an exhaust system of the engine, and a third rotary electric machine coupled to an axle of a motor vehicle, the arrangement being such that exhaust energy of the engine is converted by the first and second rotary electric machines to electric energy which is employed to drive the third rotary electric machine, thereby recovering the exhaust energy.

Another object of the present invention is to provide a thermal energy recovery apparatus of the type described, wherein when the engine is idling, electric power is generated by the first rotary machine, which is operating as a generator, so that the turbine efficiency of the turbocharger which drives the first rotary machine will be optimized, and a battery is charged by electric power generated by the second rotary machine.

Still another object of the present invention is to provide a thermal energy recovery apparatus of the type described, wherein when the motor vehicle is subjected to engine braking, the battery is charged by electric power generated by the first, second, and third rotary electric machines, which operate as generators.

Yet another object of the present invention is to provide a thermal energy recovery apparatus wherein when the engine operates under a moderate load, the first rotary electric machine operating as a motor is driven by electric power from the battery according to a boost pressure for thereby increasing a supercharging pressure.

A further object of the present invention is to provide a thermal energy recovery apparatus wherein when the engine is rotated at a low speed under a high load, the first rotary electric machine operates as a motor and is driven by electric power from the battery according to a boost pressure for increasing a supercharging pressure, and the third rotary electric machine is driven as a motor by electric power generated by the second rotary electric machine.

A still further object of the present invention is to provide a thermal energy recovery apparatus wherein when the engine is subjected to a low load, the third rotary electric machine is driven by electric power which is generated by the first and second rotary electric machines, which operate as generators, such that the efficiency of the turbines, which drive the first and second rotary electric machines, will be optimized.

According to the present invention, an apparatus is provided for recovering thermal energy from an engine mounted on a motor vehicle, comprising a first rotary electric machine coupled to a rotatable shaft of a turbocharger mounted on the engine, a second rotary electric machine coupled as a generator to a rotatable shaft of an exhaust turbine disposed in an exhaust system of the engine, a third rotary electric machine mounted on an axle of the motor vehicle, a battery for storing electric power generated by the first, second, and third rotary machines, means for detecting a rotational speed of the engine, means for detecting a load on the engine, means for detecting a boost pressure of the engine, and means for controlling the first, second, and third rotary machines according to the rotational speed, load, and boost pressure of the engine.

The above and other objects, features and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENT

Figure 1:
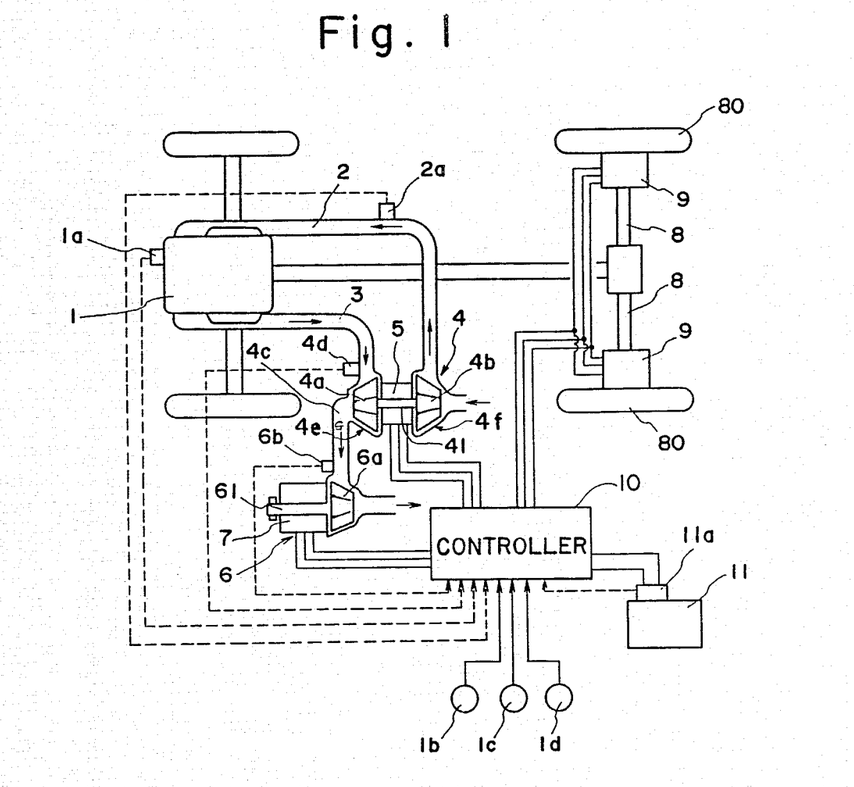
FIG. 1 is a schematic view, partly in block form, of an apparatus for recovering thermal energy from an engine according to the present invention.

Referring to FIG. 1, a thermal insulated internal combustion engine 1 is illustrated. Combustion chambers and an exhaust system of the engine 1 are made of a thermal insulating material. A turbocharger 4 is mounted on the engine 1, operated by the energy of exhaust gas from the engine 1. The turbocharger 4 has a turbine 4e coupled to an exhaust pipe 3 of the engine 1 and a compressor 4f coupled to an intake pipe 2 of the engine 1. The turbine 4e has turbine blades 4a and the compressor 4f has compressor blades 4b. The turbine blades 4a and the compressor blades 4b are interconnected by a rotatable shaft 41. Mounted on the rotatable shaft 41 is a first rotary electric machine 5 that can be selectively operated as either a generator or a motor. The first rotary machine 5 operates as a generator to produce AC electric power when the turbine blades 4a are driven by the energy of the exhaust gas discharged through the exhaust pipe 3. When a prescribed amount of AC electric power is supplied, the first rotary machine 5 operates as a motor to drive the rotatable shaft 41 and hence the compressor blades 4b, thus assisting the turbocharger 4 in supercharging the engine.

An exhaust turbine 6 is coupled to an exhaust outlet 4c of the turbocharger 4 and has turbine blades 6a which can be driven by exhaust gas G, which has residual energy discharged from the turbocharger 4. The turbine blades 6a of the exhaust turbine 6 are coupled to a rotatable shaft 61. A second rotary electric machine 7, which serves as a generator, is mounted on the rotatable shaft 61. The second rotary machine 7 generates AC electric power when the turbine blades 6a are driven by the energy of the exhaust gas G.

An engine rotation sensor 1a for detecting the rotational speed S of the engine 1 is mounted on the engine 1. A sensor 2a is disposed on the intake pipe 2 for detecting a boost pressure P. An exhaust pressure sensor 4d is disposed at an inlet of the turbocharger 4 at the exhaust pipe 3 for detecting an exhaust gas pressure. An exhaust pressure sensor 6b is mounted near an inlet of the exhaust turbine 6 for detecting the pressure of the exhaust gas G introduced into the exhaust turbine 6. Data detected by these sensors are applied in signals to a controller 10, which is described later.

Two drive wheels 80 are mounted respectively on drive axles 8, which are driven by the engine 1. A pair of third rotary electric machines 9, that can be operated selectively as either generators or motors, are mounted one on each of the drive axles 8. The third rotary machines 9 have rotatable shafts directly coupled to their respective drive axles 8. The Ac output from the first rotary machine 5 operating as a generator and the AC output from the second rotary machine 7 are supplied to the controller 10 and converted thereby to prescribed AC electric power. When such converted AC electric power is supplied from the controller 10 to the third rotary machines 9, the rotary machines 9 operate as motors to rotate the drive axles 8 for thereby driving the drive wheels 80. When the motor vehicle is braked, the third rotary machines 9 operate as generators to convert the braking force to AC electric energy which is delivered to the controller 10.

The controller 10 comprises a microcomputer having an input/output interface composed of a converter for converting AC frequencies, an inverter for converting DC to AC, and a rectifier for converting AC to DC. The controller 10 is supplied with various control signals including, in addition to the signals from the engine rotation sensor 1a, the boost sensor 2b, and the exhaust pressure sensors 4d, 6b, detected signals from an accelerator sensor 1b which detects the depth to which an accelerator pedal is depressed, a clutch sensor 1c for detecting the extent to which a clutch is engaged, and a gear sensor 1d for detecting a gear position of a gear transmission.

A battery 11 is coupled to the controller 10 via an integrator 11a which integrates a current flowing into the battery 11 to calculate the stored electric power C. A signal indicative of the electrical charge is fed to the controller 10 at all times.

Operation of the apparatus thus constructed will be described below.

FIGS. 2(a) through 2(d) show a processing flowchart of the operation of the apparatus. The controller 10 ascertains in step 1 (FIG. 2(a)) whether or not the engine rotational speed S is lower than 800 rpm, based on the engine rotation signal from the engine rotation sensor 1a. If the engine rotational speed S is lower than 800 rpm, then the operation proceeds to step 2. If the signal from the clutch sensor 1c indicates "On", i.e., the clutch is connected, in step 2, the operation proceeds to step 3. In step 3 the gear signal from the gear sensor 1d is checked if an "OFF" indicating a neutral gear position is detected, then the operation proceeds to step 4. The above conditions checked for in steps 1 through 3 indicate that the engine is idling. In step 4 the controller 10 effects control of the turbocharger 4 for optimum efficiency according to a control sequence shown in FIG. 3. The first rotary machine 5 on the turbocharger 4 operates as a generator, and the second rotary machine 7 on the exhaust turbine 6 generates electric power, as indicated in step 5. Generated AC electric power from the first and second rotary machines 5, 7 is supplied to the controller 10 which then converts the AC electric power to DC electric power with its rectifier. The battery 11 is then charged by the controller 10 through the integrator 11a, as shown in step 6.

The optimum control of the tubine will be described with reference to FIG. 3.

It is assumed that the temperature at the inlet of the turbine 4e is T1, the pressure at the turbine inlet is P1, the temperature at the turbine outlet is T2, the pressure at the turbine outlet is P2, the rotational speed of the turbine 4e per minute is N, the volumetric flow rate by the turbine 4e is V, and a gas constant is R. The gas flow speed C1 can be calculated by the following equations (1) and (2) in steps a, b and c:

$$\frac{NV}{2 \cdot 60} \eta \frac{P1}{RT1} = AC \cdot C1\gamma = AC \cdot C1 \cdot \frac{P2}{RT2} \quad (1)$$

-continued $$C1 = \frac{NV}{120} \eta \cdot \frac{T2P1}{T1P2} \cdot \frac{1}{AC} \quad (2)$$

In step d, the inlet shut-up temperature Tz* (the minimum operating temperature for the turbocharger 4) is calculated by the following equation (3):

$$Tz^* = Tz + \frac{AC1^2}{Cp2g} \quad (3)$$

where Cp is an average specific heat at constant pressure, and $AC1^2/2g$ is the kinetic energy at the nozzle outlet.

An adiabatic expansion rate Cad is calculated in step e by the following equation (4):

$$Cad = 91.5 \left[ CpTz^* \left( 1 - \left(\frac{T2}{Tz}\right)^{\frac{1}{\frac{n2}{n2-1} \frac{k-1}{k}}} \right) \cdot (1-\rho) \right]^{\frac{1}{2}} \quad (4)$$

The turbine speed U is calculated from a signal from a speed sensor on the turbine in step f. If the speed U is larger than 0.7 Cad in step g, then the load on the generator on the turbine shaft is increased in step h.

If the speed U is equal to 0.7 Cad in step i, then control proceeds from step i to step j in which the optimum condition is kept for a time Δt. If the speed U is found not to equal 0.7 Cad in step i, then the load on the generator is reduced in step k. Thereafter, control goes back to step a and repreats the control sequence.

Various numerical values such as the temperatures and pressures of the turbocharger 4 and the exhaust turbine 6, together with various constants, are stored in the controller 10 in various stages of operation of the turbine.

Figure 2:
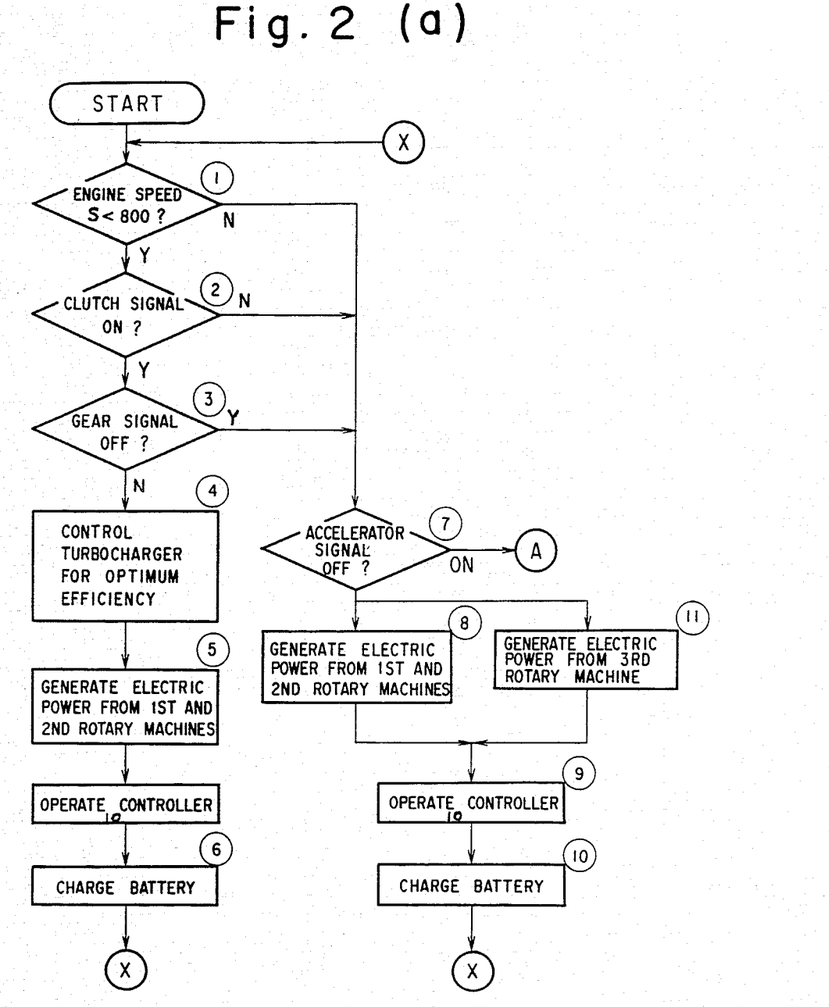
FIGS. 2(a) through 2(d) are flowcharts of an operation sequence of the apparatus of FIG. 1.

If the engine rotational speed R is higher than 800 rpm in step 1 in FIG. 2(a), or if the clutch signal is ON in step 2, or if the gear signal is OFF indicating the gear position is other than the neutral position in step 3, then control goes to step 7. If the signal from the accelerator sensor 1b is OFF, indicating that the accelerator pedal is not depressed, in step 7, then engine braking is indicated, and the first rotary machine 5 is operated as a generator to exert a load on the exhaust pressure from the engine 1 and the load on the second rotary machine 7 is increased in step 8, thus increasing the engine braking force. The battery 11 is charged through the controller 10 in steps 9 and 10. The third rotary machines 9 on the drive axles 8 are operated as generators in step 11 to generate AC electric power for converting the motor vehicle braking force to electric energy. Then, the battery 11 is charged through the controller 10 for energy recovery in steps 9 and 10.

If the signal from the accelerator sensor 1b is ON, indicating depression of the accelerator pedal, in step 7, then control proceeds to step 12 in FIG. 2(b). If the extent L of depression of the accelerator pedal is found to be smaller than a threshold depression quantity L2 (FIG. 4) in step 12, and if the extent L of depression of the accelerator pedal is found to be larger than a second threshold depression quantity L3 in step 13, then the accelerator position and the engine rotational speed at this time are detected by the respective sensors in step 14. The boost pressure P for the engine 1 is determined in step 15. If the boost pressure P as detected by the boost sensor 2a is smaller than the turbine outlet pressure P2 in step 16, then the first rotary machine 5 on the turbocharger 4 is operated as a motor, and electric power from the battery 11 is converted by the inverter in the controller 10 to AC electric power having a prescribed frequency, which is suppied to drive the compressor blades 4b for supplying supercharged air to the engine 1 to increase its response, in step 17. If the boost pressure P is larger than the turbine outlet pressure P2, then the electric power supplied to the first rotary machine 5 then operating as the motor is reduced in step 18. If the boost pressure P is equal to the turbine outlet pressure P2 in step 19, then that condition is kept for the time Δt in step 20.

Figure 4:
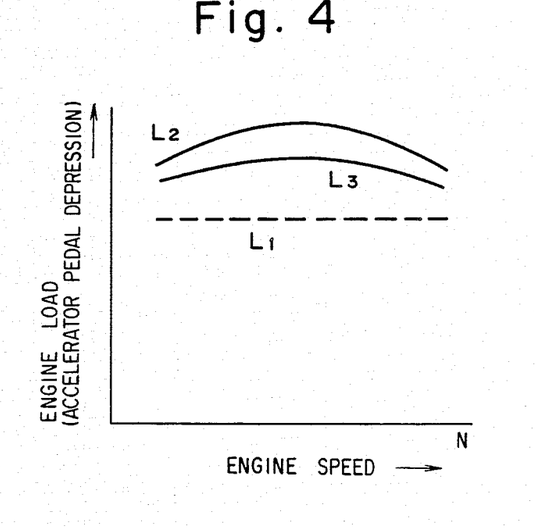
FIG. 4 is a graph showing the relationship between rotational speeds of the engine and loads on the engine.

If the extent of depression L of the accelerator pedal is ascertained to be greater than the threshold level L2 (i.e., is sufficiently depressed so that L>L2) in step 12, indicating that the load on the engine is larger, and if the engine rotational speed S is found to be lower than a prescribed speed S1 in step 21, then the accelerator position is detected in step 22 and electric power for the first rotary machine 5 operating as the motor is determined in step 23. The electric power from the battery 11 is supplied through the controller 10 to the first rotary machine 5 for thereby increasing the boost pressure P to increase the engine power output. The boost pressure P is detected from the signal from the boost sensor 2a in step 24. If the detected boost pressure P is found to be lower than a prescribed boost pressure P1 in step 25, then the electric power supplied to the first rotary machine 5 is increased in step 26.

Figure 3:
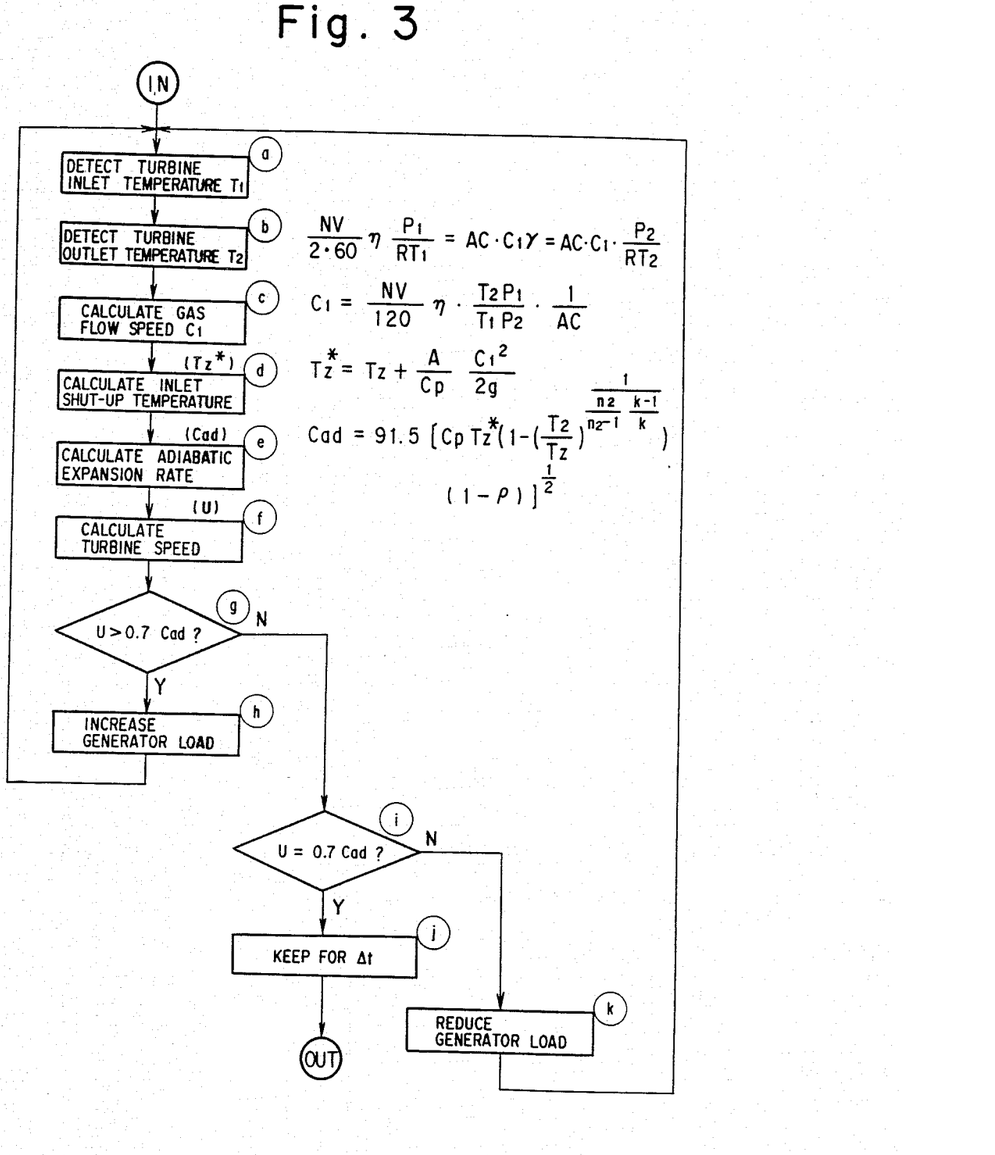
FIG. 3 is a flowchart of a control sequence for optimum turbine efficiency.

If the actual boost pressure P is found to be equal to or higher than the desired boost pressure P1 in step 25, then the exhaust turbine 6 is controlled for optimum efficiency in step 27 in a manner similar to the optimum turbine control as shown in FIG. 3. The second rotary machine 7 is driven as a generator to produce electric power that is supplied to the controller 10. The supplied electric power is frequency-converted by the controller 10 to supply suitable AC electric power to the third rotary machines 9 for driving them as motors in step 28.

If the accelerator position L is found to be smaller than the second threshold level L3 in step 13, then control goes to step 29 in FIG. 2(c). If the accelerator position L is larger than a third threshold level L1 (FIG. 4), then the exhaust pressure PE at the inlet of the turbocharger 4 is measured, and in step 30 the turbocharger 4 is controlled in the same manner as the aforesaid optimum turbine control. If in step 31 the exhaust pressure PE is found to be higher than a predetermined pressure level, which is the sum of PE1 and ΔPA, then the output from the first rotary machine 5 is reduced by an amount ΔW to reduce the load in step 32. When the exhaust pressure PE is thereby made equal to or smaller than the predetermined pressure level (PE1+ΔPA), control goes to step 33, in which the exhaust pressure PE' from the exhaust pressure sensor 6b is measured. The exhaust turbine 6 is controlled in step 34 in the same manner as the foregoing optimum turbine control. If an exhaust pressure PE' is found to be higher than a prescribed exhaust pressure PE2 in step 35, then the output from the second rotary machine 7 then operating as the generator is reduced by an amount ΔW1 in step 36, thereby lowering the exhaust pressure PE'.

Next, in step 37, the electrical output from the first rotary machine (acting as a generator) and the electrical output from the second rotary machine 7 (acting as a generator) are delivered to the controller 10. The supplied electric power is frequency-converted by the converter in the controller 10 in step 38, and the converted electric power is supplied to the third rotary machines 9 to operate them as motors in step 39 for driving the wheels 80. In the routine from steps 30 to 39, as described above, the load on the engine 1 is relatively small, as in general driving conditions, requiring the turbocharger, and the exhaust gas pressure is converted by the first and second rotary machines 5, 7 to electric power that is employed to drive the wheels 80.

If the accelerator position L is smaller than the third threshold level L1 (FIG. 4) in step 29, then control goes to step 40, in which the boost pressure P is measured by the boost sensor 2b. If the boost pressure P is found to be smaller than a prescribed threshold boost pressure Po in step 41, then control goes to step 42 in which the first, second, and third rotary machines 5, 7, 9 are held idling. If the boost pressure P is found to be higher than Po in step 41, then the turbocharger 4 is controlled for optimum conditions in the same manner as the aforesaid optimum turbine control. If the boost pressure P is lower than Po in step 44, then the output from the first rotary machine 5, acting as a generator, is reduced by the amount ΔW in step 45. Thereafter, control returns from step 45 to step 44. If the boost pressure P is higher than Po in step 44, then the exhaust turbine 6 is controlled for optimum conditions in the same manner as the aforesaid optimum turbine control in step 46 (FIG. 2(d)).

If the boost pressure P is found to be lower than Po in step 47, then the electric power generated by the second rotary machine 7 is reduced in step 48 to an extent which does not lower the thermal efficiency of the boost pressure. Then, the AC output from the first rotary machine 5 and the AC output from the second rotary machine 7 are supplied to the controller 10 and converted by the converter therein. The converted electric energy is then applied to the third rotary machine 9 to drive the wheels 80 in step 49.

If the boost pressure P is higher than Po in step 47, then the output from the first rotary machine 5 and the output from the second rotary machine 7 are delivered to the controller 10, which rectifies the supplied electric power and charges the battery 11 in step 50. If step 51 determines that the stored electric power C in the battery 11 is sufficient based on the signal from the integrator 11a, then the DC electric power from the battery 11 is applied to the controller 10 and converted thereby to AC electric power. The output from the first rotary machine 5 and the output from the second rotary machine 7 are added and supplied to the third rotary machines 9, which are operated as the motors to drive the wheels 80 in step 52.

If the stored electric power C in the battery 11 is found to be lower than a prescribed level Cm in step 51, then control proceeds to step 53 in which the AC electric power from the first and second rotary machines 5, 7 is supplied through the controller 10 to the third rotary machines 9 for driving the wheels 80 in steps 53, 54.

Although a certain preferred embodiment has been shown and described, it should be understood that many changes and modifications may be made therein without departing from the scope of the appended claims.

What I claim is:

1. An apparatus for recovering thermal energy from an engine mounted on a motor vehicle and having an exhaust system, comprising:

a turbocharger mounted on the engine and having a rotatable shaft;
    an exhaust turbine having a rotatable shaft and disposed in the exhaust system;
    a first rotary electric machine coupled to the rotatable shaft of said turbocharger;
    a second rotary electric machine coupled to the rotatable shaft of said exhaust turbine;
    at least one third rotary electric machine mounted on an axle of the motor vehicle;
    a battery for storing electric power generated by said first, second, and third rotary electric machines;
    means for detecting the rotational speed of the engine;
    means for detecting the load on the engine;
    means for detecting the boost pressure of the engine; and
    a controller for controlling said first, second, and third rotary electric machines to operate as generators or motors according to the rotational speed, load, and boost pressure of the engine.

2. An apparatus according to claim 1, wherein said controller comprises means for controlling said first rotary electric machine to operate as a generator, means for controlling said second rotary electric machine to operate as a generator, and means for charging said battery with electric power generated by said first and second rotary electric machines, while the engine is idling.

3. An apparatus according to claim 2, wherein said means for controlling said first rotary machine to operate as a generator has means for controlling the generator load such that the turbine of said turbocharger will be operated with an optimum efficiency according to a relationship between the turbine speed and the adiabatic expansion rate.

4. An apparatus according to claim 1, wherein said controller comprises means for controlling said first and third rotary electric machines to operate as generators, means for controlling said second rotary electric machine to operate as a generator, and means for charging said battery with electric power generated by said first, second, and third rotary electric machines, while the motor vehicle is subjected to engine braking.

5. An apparatus according to claim 1, wherein said controller has means for controlling said first rotary electric machine to operate as a motor energized by electric power from said battery while the engine is subjected to a medium load.

6. An apparatus according to claim 5, wherein said means for controlling said first rotary electric machine to operate as a motor has means for controlling electric power supplied to said first rotary electric machine according to the boost pressure.

7. An apparatus according to claim 1, wherein said controller comprises means for controlling said first rotary electric machine to operate as a motor energized by electric power from said battery, means for controlling sid second rotary electric machine to operate as a generator, and means for controlling said third rotary electric machine to operate as a motor energized by electric power generated by said second rotary electric machine, while the engine is rotating at a low speed under a high load.

8. An apparatus according to claim 7, wherein said means for controlling said first rotary electric machine has means for supplying electric power to said first rotary electric machine according to the boost pressure.

9. An apparatus according to claim 1, wherein said controller has means for controlling said third rotary electric machine to operate as a motor energized by electric power generated by said second rotary electric machine when the boost pressure is higher than a prescribed value while the engine is rotating at a low speed under a high load.

10. An apparatus according to claim 1, wherein said controller has means for controlling the generator load of said second rotary electric machine when operating as a generator such that said exhaust turbine will be operated with an optimum efficiency.

11. An apparatus according to claim 1, wherein said controller comprises means for controlling said first rotary electric machine to operate as a generator, means for controlling said second rotary electric machine to operate as a generator, and means for controlling said third rotary electric machine to operate as a motor energized by electric power generated by said first and second rotary electric machines while the engine is being subjected to a low load.

12. An apparatus according to claim 11, wherein said means for controlling said first rotary electric machine to operate as a generator has means for controlling the generator load of said first rotary electric machine operating as a generator such that a turbine of said turbocharger will be operated with an optimum efficiency.

13. An apparatus according to claim 11, wherein said means for controlling said second rotary electric machine has means for controlling the generator load of said second rotary electric machine operating as a generator such that said exhaust turbine will be operated with an optimum efficiency.

* * * * *

UNITED STATES PATENT AND TRADEMARK OFFICE
CERTIFICATE OF CORRECTION

PATENT NO. : 4,774,811

DATED : October 4, 1988

INVENTOR(S) : Hideo Kawamura

It is certified that error appears in the above-identified patent and that said Letters Patent is hereby corrected as shown below:

Column 3, line 38, after "engine" insert --1--;

line 66, "Ac" should be --AC--.

Column 8, line 59, "sid" should be --said--.

Signed and Sealed this

Fourth Day of April, 1989

Attest:

DONALD J. QUIGG

Attesting Officer

Commissioner of Patents and Trademarks